(12) United States Patent
Wu et al.

(10) Patent No.: US 12,245,267 B2
(45) Date of Patent: Mar. 4, 2025

(54) DATA TRANSMISSION METHOD AND APPARATUS

(71) Applicant: HUAWEI TECHNOLOGIES CO., LTD., Guangdong (CN)

(72) Inventors: Tao Wu, Shenzhen (CN); Teyan Chen, Shenzhen (CN); Jian Yu, Shenzhen (CN); Jia Jia, Guangdong (CN); Yingzhuang Liu, Hubei (CN); Yuanyuan Peng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 17/478,305

(22) Filed: Sep. 17, 2021

(65) Prior Publication Data

US 2022/0007386 A1 Jan. 6, 2022

Related U.S. Application Data

(63) Continuation of application No. PCT/CN2020/079542, filed on Mar. 16, 2020.

(30) Foreign Application Priority Data

Mar. 19, 2019 (CN) .......................... 201910207982.4

(51) Int. Cl.
*H04W 72/566* (2023.01)
*H04N 21/61* (2011.01)
*H04W 72/044* (2023.01)

(52) U.S. Cl.
CPC ...... *H04W 72/569* (2023.01); *H04N 21/6156* (2013.01); *H04N 21/6175* (2013.01); *H04W 72/044* (2013.01)

(58) Field of Classification Search
CPC . H04W 72/569; H04W 72/044; H04W 72/56; H04N 21/6156; H04N 21/6175;
(Continued)

(56) References Cited

U.S. PATENT DOCUMENTS

2008/0214128 A1* 9/2008 Lim ..................... H04B 7/0634
455/127.1
2010/0257422 A1* 10/2010 Kim ..................... H04L 5/0023
375/267
(Continued)

FOREIGN PATENT DOCUMENTS

| CN | 101340592 A | 1/2009 |
| CN | 104022850 A | 9/2014 |
| CN | 104092643 A | 10/2014 |
| WO | WO-2017067253 A1 * | 4/2017 ............ H04W 72/12 |
| WO | 2019205803 A1 | 10/2019 |

OTHER PUBLICATIONS

English Translation of WO 2017/067253 (Year: 2017).*
(Continued)

*Primary Examiner* — Sun Jong Kim
(74) *Attorney, Agent, or Firm* — Fish & Richardson P.C.

(57) ABSTRACT

The disclosure relates to the wireless transmission field, and discloses a data transmission method and apparatus. An example method includes: A transmit end generates a data packet; and the transmit end sends the data packet to a receive end, where the data packet includes at least two pieces of video service data having different priorities, and the pieces of video service data having different priorities are carried on different communications resources for transmission.

18 Claims, 11 Drawing Sheets

(58) Field of Classification Search
CPC ........... H04N 21/43637; H04N 21/631; H04B 7/063; H04B 7/0413; H04B 7/0626; H04L 1/1896; H04L 5/0064; H04L 5/0023; H04L 5/0051; H04L 65/80; H04L 67/06; H04L 69/14; H04L 1/1607
See application file for complete search history.

(56) References Cited

U.S. PATENT DOCUMENTS

| | | | |
|---|---|---|---|
| 2011/0128923 A1 | 6/2011 | Cilli et al. | |
| 2013/0273854 A1* | 10/2013 | Zhang | H04B 7/022 455/67.11 |
| 2013/0336416 A1* | 12/2013 | Sivanesan | H04W 72/563 375/267 |
| 2015/0110168 A1 | 4/2015 | Chi et al. | |
| 2015/0349915 A1 | 12/2015 | Eum | |
| 2017/0070295 A1* | 3/2017 | Remein | H04B 10/50 |
| 2017/0104562 A1 | 4/2017 | Doken et al. | |
| 2018/0014298 A1* | 1/2018 | Sun | H04W 72/21 |
| 2019/0037505 A1* | 1/2019 | Wang | H04L 5/00 |

OTHER PUBLICATIONS

Fdng Ni'na et al., "GOP-level video transmission method using data partitioning in H.264/AVC," Journal of Xidian University, vol. 38, No. 3, Jun. 2011, 20 pages (English abstract).

ITU-T H.264 (Apr. 2017), "Series H: Audiovisual and Multimedia Systems, Infrastructure of audiovisual services—Coding of moving video, Advanced video coding for generic audiovisual services," Apr. 2017, 812 pages.

PCT International Search Report and Written Opinion issued in International Application No. PCT/CN2020/079542 on Apr. 16, 2020, 13 pages (with English translation).

Extended European Search Report issued in European Application No. 20773737.0 on Apr. 12, 2022, 8 pages.

Naghshineh et al., "End-to-End QoS Provisioning in Multimedia Wireless/Mobile Networks Using an Adaptive Framework," IEEE Communications Magazine, vol. 35, No. 11, Nov. 1997, 10 pages.

EP Communication Pursuant to Article 94(3) EPC in European Appln No. 20773737.0, dated Jul. 25, 2024, 7 pages.

\* cited by examiner

| L-STF | L-LTF | L-SIG | SYM for auto-detection | EHT-SIG-A | EHT-SIG-B | EHT-STF | EHT-LTF | Video service data having a first priority | PE |
| | | | | | | EHT-STF | EHT-LTF | Video service data having a second priority | PE |

FIG. 5

DATA TRANSMISSION METHOD AND APPARATUS

CROSS-REFERENCE TO RELATED APPLICATIONS

This application is a continuation of International Application No. PCT/CN2020/079542, filed on Mar. 16, 2020, which claims priority to Chinese Patent Application No. 201910207982.4, filed on Mar. 19, 2019. The disclosures of the aforementioned applications are hereby incorporated by reference in their entireties.

TECHNICAL FIELD

This application relates to the wireless transmission field, and in particular, to a data transmission method and apparatus.

BACKGROUND

When service data is to be transmitted based on wireless fidelity (Wi-Fi), a transmit end determines a transmission mode for the service data based on a service type of the service data, to transmit the service data. For example, the service data is video service data. The transmit end sends the video service data in a transmission mode for a video service. However, there is only one transmission mode for the video service data, and the video service data can be transmitted in only one transmission mode. As a result, data transmission flexibility is relatively poor.

SUMMARY

To resolve a related technical problem, embodiments of this application provide a data transmission method and apparatus. The technical solutions are as follows:

According to a first aspect, a data transmission method is provided, where the method includes: A transmit end generates a data packet; and the transmit end sends the data packet to a receive end, where the data packet includes at least two pieces of video service data having different priorities, and the pieces of video service data having different priorities are carried on different communications resources for transmission.

The data packet is a physical layer data packet, may be referred to as a data packet, and generally, is also referred to as a physical layer protocol data unit (PPDU). Each data packet includes a preamble and a data field. The data field may include a plurality of different physical layer service data units (PSDUs), and each PSDU is obtained by encapsulating video service data. A main function of the preamble is to assist in data field transmission, and the preamble carries information such as a transmission parameter of the data field, so that the receive end parses the data field. The preamble may include a plurality of different fields, and the field may include information such as resource unit allocation information, modulation and coding, and a spatial stream, so that the data field in the data packet can be sent on a corresponding communications resource and received by the receive end on the corresponding communications resource.

The pieces of video service data in the foregoing data packet may be allocated a plurality of different priorities. There may be a plurality of classification rules for a priority of video service data. For example, the priority of the video service data is a level obtained by classifying the video service data based on importance of the video service data. Greater importance of the video service data indicates a higher priority of the video service data.

The communications resource is a carrier for data transmission, and may include a frequency domain resource, a spatial resource, a time-frequency resource, and the like. In this embodiment of this application, the communications resource mainly includes a frequency domain resource and a spatial resource. The frequency domain resource may include an RU (Resource Unit) and a frequency band. The spatial resource may be a spatial stream, and a quantity of spatial streams M is generally less than or equal to a quantity of transmit antennas or receive antennas. If the quantity of transmit antennas is not equal to the quantity of receive antennas, the quantity of spatial streams M is equal to or less than a smaller quantity of the quantity of transmit antennas and the quantity of receive antennas.

In this way, a plurality of resources are allocated to each terminal, so that the terminal can perform data transmission by using the plurality of resources, thereby reducing a degree of data transmission obstruction to some extent. In addition, it can be ensured that video service data having a high priority can obtain better resources. This improves transmission quality of the video service data, and reduces frame freezing.

In a possible implementation, the communications resource includes a spatial stream, an RU, or a frequency band.

The frequency domain resource may include an RU, and a correspondence between a frequency domain resource and a priority of video service data may be a correspondence between an RU and a priority of video service data. The correspondence between an RU and a priority of video service data is determined based on a correspondence between a transmission capability of an RU and a priority. There may be a plurality of methods for determining the transmission capability of the RU. A feasible manner is that the transmit end determines the transmission capability based on feedback information sent by the receive end. For example, the feedback information is a power for receiving a sounding signal on each RU. A method for determining the transmission capability of the RU may be as follows: The transmit end sends a sounding signal to the receive end; when receiving the sounding signal, the receive end determines a power for receiving the sounding signal on each RU; the receive end sends, to the transmit end, the power for receiving the sounding signal on each RU; and the transmit end determines the transmission capability of the RU based on the power. For example, the feedback information is a sounding signal. A method for determining the transmission capability of the RU may be as follows: The receive end sends a sounding signal to the transmit end; and when receiving the sounding signal, the transmit end determines a power for receiving the sounding signal on each RU, to further determine a transmission capability of each RU. In addition, the transmission capability of the RU may alternatively be determined by using another method. This is not limited in this application.

The frequency domain resource may alternatively include a frequency band, and a correspondence between a frequency domain resource and a priority of video service data may be a correspondence between a frequency band and a priority of video service data. The correspondence between a frequency band and a priority of video service data is determined based on a correspondence between a transmission capability of a frequency band and a priority. There may be a plurality of methods for determining the transmission capability of the frequency band. A feasible manner is that the transmit end determines the transmission capability based on feedback information sent by the receive end. The feedback information may include signal quality of each frequency band, a received signal power for receiving a sounding signal on each frequency band, or the like.

In a possible implementation, that the pieces of video service data having different priorities are carried on different communications resources for transmission includes: Based on a correspondence between a communications resource and a priority of video service data, the pieces of video service data having different priorities are carried on different communications resources for transmission, where the correspondence between a communications resource and a priority of video service data is determined based on feedback information of the receive end.

There may be a plurality of spatial streams in a multiple-input multiple-output (MIMO) system. A correspondence between a spatial stream and a priority of video service data may be determined by the transmit end based on the feedback information sent by the receive end. Based on different feedback information, the correspondence may be determined in a plurality of different manners. The feedback information may include a sounding signal, a power value of each transmit antenna, one or more indication bits, and the like. In this way, based on the feedback information sent by the receive end, the transmit end may obtain signal quality of different resources more accurately, so that the transmit end may allocate a resource with relatively high signal quality to video service data having a high priority, thereby ensuring transmission quality.

In a possible implementation, the communications resource includes a spatial stream, the feedback information includes a sounding signal, and a correspondence between the spatial stream and a priority of video service data is determined by the transmit end based on received signal powers of the sounding signal that are detected by a plurality of transmit antennas of the transmit end.

The sounding signal may be a signal dedicated for channel detection, or may be a signal for sending conventional service data, or the like. The sounding signal may be periodically sent, or may be sent after being triggered by a preset event. The sounding signal is a signal transmitted by the receive end to the transmit end.

In the solution in this embodiment of this application, a data transmission channel is established between each antenna of the transmit end and each antenna of the receive end. The receive end transmits the sounding signal to the transmit end through each channel of each antenna. Each transmit antenna of the transmit end receives the sounding signal through different channels, determines channel state information for receiving the sounding signal through the different channels, then determines, based on the channel state information of the different channels, a power at which the transmit antenna receives the sounding signal on each channel, and determines a sum of powers at which the transmit antenna receives the sounding signal on all corresponding channels, that is, a received signal power of the sounding signal detected by each transmit antenna. A value relationship between received signal powers of different transmit antennas is determined, and a correspondence between a spatial stream of a transmit antenna and a priority of video service data is determined. To ensure transmission quality of video service data having a high priority, a correspondence between a spatial stream and a priority may be that a spatial stream of a transmit antenna with a high received signal power corresponds to a high priority, and a spatial stream of a transmit antenna with a low received signal power corresponds to a low priority. In this way, the receive end feeds back the sounding signal to the transmit end, and the transmit end can obtain received signal powers of different spatial streams. A transmission process consumes less time, so that efficiency of obtaining the received signal powers of the spatial streams by the transmit end is relatively high.

In a possible implementation, the communications resource includes a spatial stream; and the feedback information includes a plurality of indication bits, one of the plurality of indication bits corresponds to one of a plurality of frequency bands, and the one indication bit is used to indicate a correspondence that is between an antenna and a priority of video service data and that is on the one frequency band; or the feedback information includes one indication bit, and the indication bit is used to indicate a correspondence between an antenna and a priority of video service data.

One of the plurality of indication bits corresponds to one of a plurality of frequency bands, and the one indication bit is used to indicate a correspondence that is between an antenna and a priority of video service data and that is on the one frequency band. One indication bit may be represented by using one bit, each bit corresponds to one frequency band, and each bit is used to indicate a correspondence that is between an antenna and a priority and that is on the corresponding frequency band. A value of each bit may include 0 or 1, and 0 and 1 correspond to different correspondences between an antenna and a priority. One indication bit may alternatively be represented by using a plurality of bits, the one indication bit corresponding to the plurality of bits corresponds to one frequency band, and values of the plurality of bits jointly indicate correspondences that are between an antenna and a priority and that are on different frequency bands.

One indication bit corresponds to an entire frequency domain resource between the transmit end and the receive end, and the indication bit is used to indicate a correspondence between an antenna and a priority of video service data. The indication bit may be represented by using one bit, and the bit is used to indicate the correspondence between an antenna and a priority. A value of the bit may include 0 or 1, and 0 and 1 correspond to different correspondences between an antenna and a priority. The indication bit may alternatively be represented by using a plurality of bits, and values of the plurality of bits jointly indicate the correspondence between an antenna and a priority. For example, assuming that two bits represent one indication bit, 00, 01, 10, and 11 may indicate different correspondences between an antenna and a priority. The receive end generates a corresponding indication bit based on a power value of each transmit antenna and based on a correspondence that is between an antenna and a priority and that corresponds to a value of the indication bit. After receiving the indication bit, the transmit end determines the correspondence between an antenna and a priority. In this way, the receive end directly determines the correspondence between an antenna and a priority of video service data, and the transmit end does not need to determine a received signal power of the antenna, thereby reducing occupation of resources of the transmit end.

In a possible implementation, the preamble in the data packet includes indication information of the different communications resources, and the indication information is used to indicate video service data carried on a corresponding communications resource.

In the solution in this embodiment of this application, to facilitate transmission of the pieces of video service data having different priorities, the indication information of the different communications resources may be generated, and each piece of indication information is used to indicate video service data carried on a corresponding communications resource. The indication information of the different communications resources may be carried in the preamble of the data packet. In an optional manner, an EHT-SIG-B field of the preamble carries the indication information of the different communications resources. Based on indication information of each communications resource, the pieces of video service data having different priorities are carried on different communications resources for transmission.

In a possible implementation, the pieces of video service data having different priorities include at least two types of an I-frame, a P-frame, and a B-frame.

Three types of frames are defined in the important video coding standard H.264: an I-frame, where the I-frame is a completely coded video frame, and is also referred to as a key frame; a P-frame, where the P-frame is a video frame that is generated by referring to a previous I-frame and that includes only a coded different part, and is also referred to as a prediction frame; and a B-frame, where the B-frame is a video frame that is coded by referring to adjacent frames before and after the B-frame, and is also referred to as a bidirectional prediction frame. Comparatively speaking, the I-frame is more important than the P-frame and the B-frame. Therefore, generally, a priority of the I-frame may be higher than a priority of the P-frame and a priority of the B-frame.

In the solution in this embodiment of this application, there are a plurality of methods for priority classification based on a data type of video service data, and a feasible classification manner may be to perform classification by using an I-frame, a P-frame, and a B-frame. A manner in which data types of video service data are classified based on an I-frame, a P-frame, and a B-frame is used as an example to describe several feasible priority determining manners. In a first manner, the I-frame corresponds to a first priority, the P-frame corresponds to a second priority, and the B-frame corresponds to a third priority. In a second manner, the I-frame corresponds to a first priority, and the B-frame and the P-frame correspond to a second priority. The first priority is higher than the second priority, and the second priority is higher than the third priority. In this way, it can be ensured that the I-frame with greater importance is carried on a resource with higher signal quality for transmission. This improves transmission quality of a video service, and reduces frame freezing.

In a possible implementation, the pieces of video service data having different priorities include retransmitted video service data and newly-transmitted video service data, and a priority of the retransmitted video service data is higher than a priority of the newly-transmitted video service data; and the data packet further includes indication information, and the indication information is used to indicate that each piece of video service data is retransmitted video service data or newly-transmitted video service data.

The data field includes the retransmitted video service data and the newly-transmitted video service data, the preamble may include a plurality of fields, at least one field may include the indication information, and the indication information is used to indicate that each piece of video service data is the retransmitted video service data or the newly-transmitted video service data.

In the solution in this embodiment of this application, in a data transmission process, because a network is unstable, a packet loss may occur, and lost video service data needs to be retransmitted. Retransmitted video service data and newly-transmitted video service data may be classified as video service data having different priorities. To ensure transmission quality of the retransmitted video service data, a priority of the retransmitted video service data may be set to be higher than a priority of the newly-transmitted video service data. In this way, the retransmitted video service data can be carried on a resource with relatively high signal quality for transmission, thereby ensuring transmission quality of the retransmitted video service data.

In a possible implementation, the method further includes: Pieces of video service data having a plurality of priorities one-to-one correspond to a plurality of service identifiers or a plurality of access categories.

The access categories may include a video service (AC_Video, AC_VI), a voice service (AC_Voice, AC_VO), a best-effort transmission service (AC_Best Effort, AC_BE), and a background service (AC_Background, AC_BK). Contention-based transmission capabilities of the four access categories decrease in descending order.

In the solution in this embodiment of this application, to ensure transmission performance of video service data having a high priority, video service data having a relatively high priority may correspond to an access category with a relatively strong contention-based transmission capability, and video service data having a relatively low priority may correspond to an access category with a relatively weak contention-based transmission capability. For example, for different pieces of video service data in a same data packet, an I-frame, a P-frame, and a B-frame correspond to different access categories, and priorities of three types of video service data such as the I-frame, the P-frame, and the B-frame decrease in descending order. For example, the I-frame corresponds to AC_VI, and the P-frame and the B-frame correspond to AC_BE. In this way, different pieces of video service data in a same data packet are carried on different communications resources for independent transmission, without mutually increasing delays.

According to a second aspect, a data transmission apparatus is provided, where the apparatus includes:

A data transmission apparatus, where the apparatus includes:

a generation module, configured to generate, by a transmit end, a data packet; and a sending module, configured to send, by the transmit end, the data packet to a receive end, where the data packet includes at least two pieces of video service data having different priorities, and the pieces of video service data having different priorities are carried on different communications resources for transmission.

In a possible implementation, the communications resource includes a spatial stream, an RU, or a frequency band.

In a possible implementation, the sending module is configured to:

based on a correspondence between a communications resource and a priority of video service data, the pieces of video service data having different priorities are carried on different communications resources for transmission, where the correspondence between a communications resource and a priority of video service data is determined based on feedback information of the receive end.

In a possible implementation, the communications resource includes a spatial stream, the feedback information includes a sounding signal, and a correspondence between the spatial stream and a priority of video service data is determined by the transmit end based on received signal powers of the sounding signal that are detected by a plurality of transmit antennas of the transmit end.

In a possible implementation, the communications resource includes a spatial stream; and the feedback information includes a plurality of indication bits, one of the plurality of indication bits corresponds to one of a plurality of frequency bands, and the one indication bit is used to indicate a correspondence that is between an antenna and a priority of video service data and that is on the one frequency band; or the feedback information includes one indication bit, and the indication bit is used to indicate a correspondence between an antenna and a priority of video service data.

In a possible implementation, the preamble in the data packet includes indication information of the different communications resources, and the indication information is used to indicate video service data carried on a corresponding communications resource.

In a possible implementation, the pieces of video service data having different priorities include at least two types of an I-frame, a P-frame, and a B-frame.

In a possible implementation, the pieces of video service data having different priorities include retransmitted video service data and newly-transmitted video service data, and a priority of the retransmitted video service data is higher than a priority of the newly-transmitted video service data; and the data packet further includes indication information, and the indication information is used to indicate that each piece of video service data is retransmitted video service data or newly-transmitted video service data.

In a possible implementation, the apparatus further includes:

a correspondence module, configured to enable pieces of video service data having a plurality of priorities to one-to-one correspond to a plurality of service identifiers or a plurality of access categories.

According to a third aspect, a data transmission apparatus is provided, where the apparatus includes a processor and a memory. The memory stores one or more programs, where the one or more programs are configured as instructions to be executed by the processor to implement the method according to any one implementation of the first aspect.

According to a fourth aspect, a computer-readable storage medium is provided. The computer-readable storage medium includes instructions, and when the computer-readable storage medium is run on a device, the device is enabled to perform the method according to the first aspect.

According to a fifth aspect, a computer program product including instructions is provided. When the computer program product is run on a device, the device is enabled to perform the method according to the first aspect.

The technical solutions provided in the embodiments of this application bring at least the following beneficial effects:

According to the embodiments of this application, a transmit end generates a data packet, and when the data packet is sent to a receive end, pieces of video service data having different priorities are carried on different resources for transmission. In this way, a plurality of resources are allocated to each terminal, so that the terminal can perform data transmission by using the plurality of resources, thereby improving transmission flexibility. In addition, data transmission is performed by using a plurality of resources, so that a degree of data transmission obstruction can be reduced to some extent, and data transmission efficiency is improved.

BRIEF DESCRIPTION OF DRAWINGS

FIG. 5 is a schematic structural diagram of a data packet according to an embodiment of this application;

DETAILED DESCRIPTION OF EMBODIMENTS

To make the objectives, technical solutions, and advantages of this application clearer, the following further describes implementations of this application in detail with reference to the accompanying drawings.

For ease of understanding of the embodiments of this application, the following first describes a system architecture used in the embodiments of this application.

Figure 1:
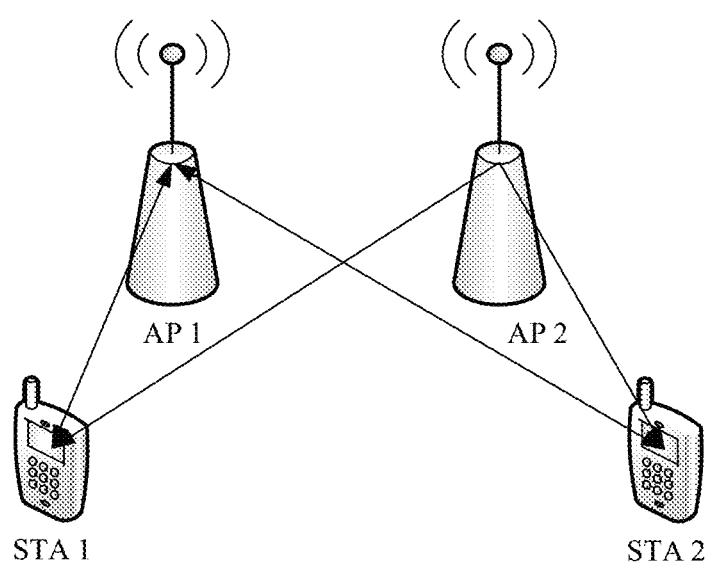
FIG. 1 is a schematic diagram of a structural framework of a system according to an embodiment of this application.

An embodiment of this application provides a data transmission method. As shown in FIG. 1, the method relates to data communication between one or more nodes and another node or other nodes. A main scenario relates to communication between an access point (AP) and a station (STA). However, the main scenario is also applicable to communication between APs and between STAs. The method may be jointly implemented by a transmit end and a receive end. The transmit end may be an AP or a STA, and the receive end may be an AP or a STA.

Figure 2:
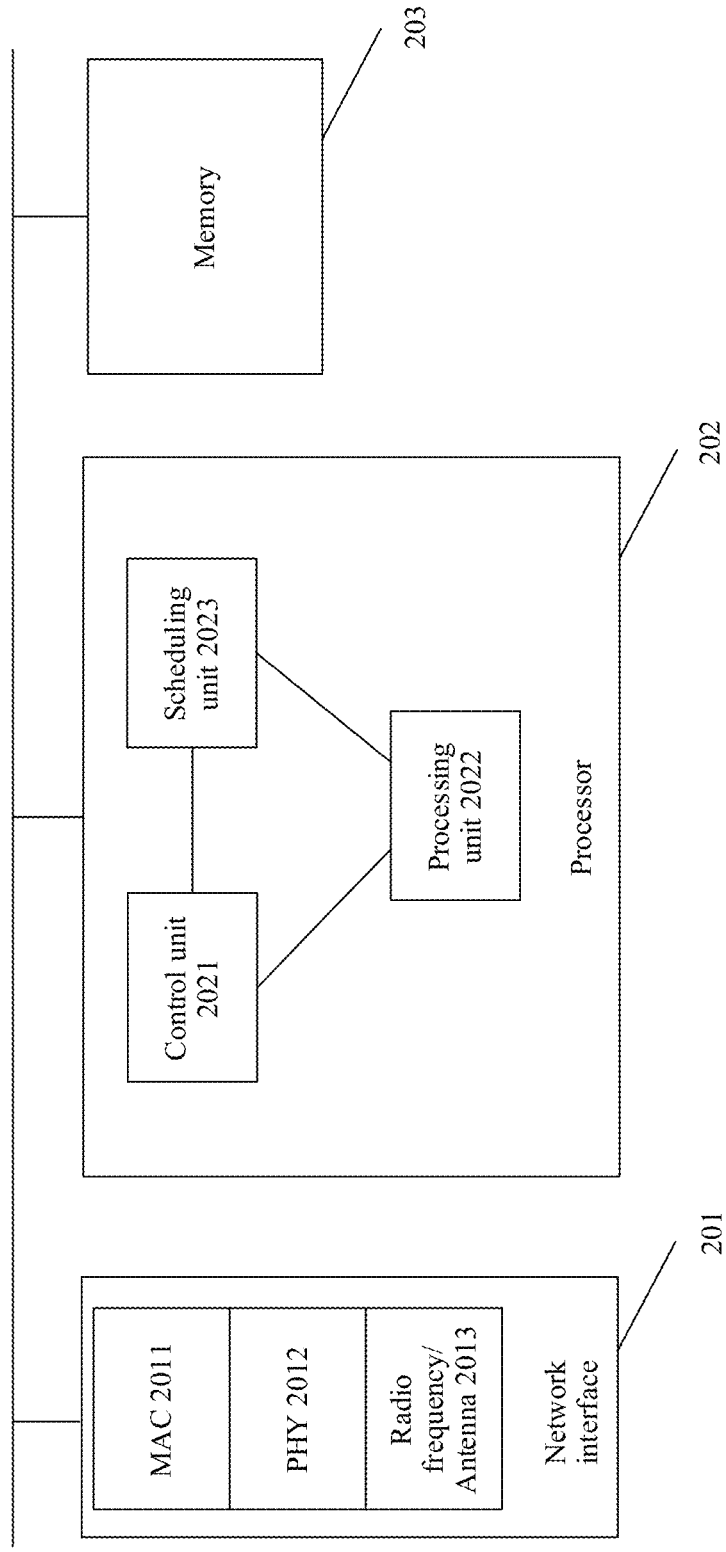
FIG. 2 is a block diagram of a transmit end according to an embodiment of this application.

The transmit end and the receive end each may be, but are not limited to, a communications server, a router, a switch, a bridge, a computer, a mobile phone, or the like. As shown in FIG. 2, the transmit end may include at least a network interface 201, a processor 202, and a memory 203. The network interface 201 is configured to send and receive a data packet, and may include an Ethernet media access controller (MAC) 2011, a physical interface transceiver (Port Physical Layer, PHY) 2012, a radio frequency/antenna 2013, and the like. The processor 202 is configured to process an operation corresponding to data transmission.

Optionally, the processor 202 may include a control unit 2021, a processing unit 2022, and a scheduling unit 2023. The control unit 2021 is configured to control execution of an operation corresponding to signaling information; the processing unit 2022 is configured to parse the signaling information, process related data, and the like; and the scheduling unit 2023 is configured to determine transmission resources, used modulation parameters, and the like for different data. The memory 203 is configured to store service data, signaling information, a preset value, and the like that are received or sent through the network interface 201.

Figure 3:
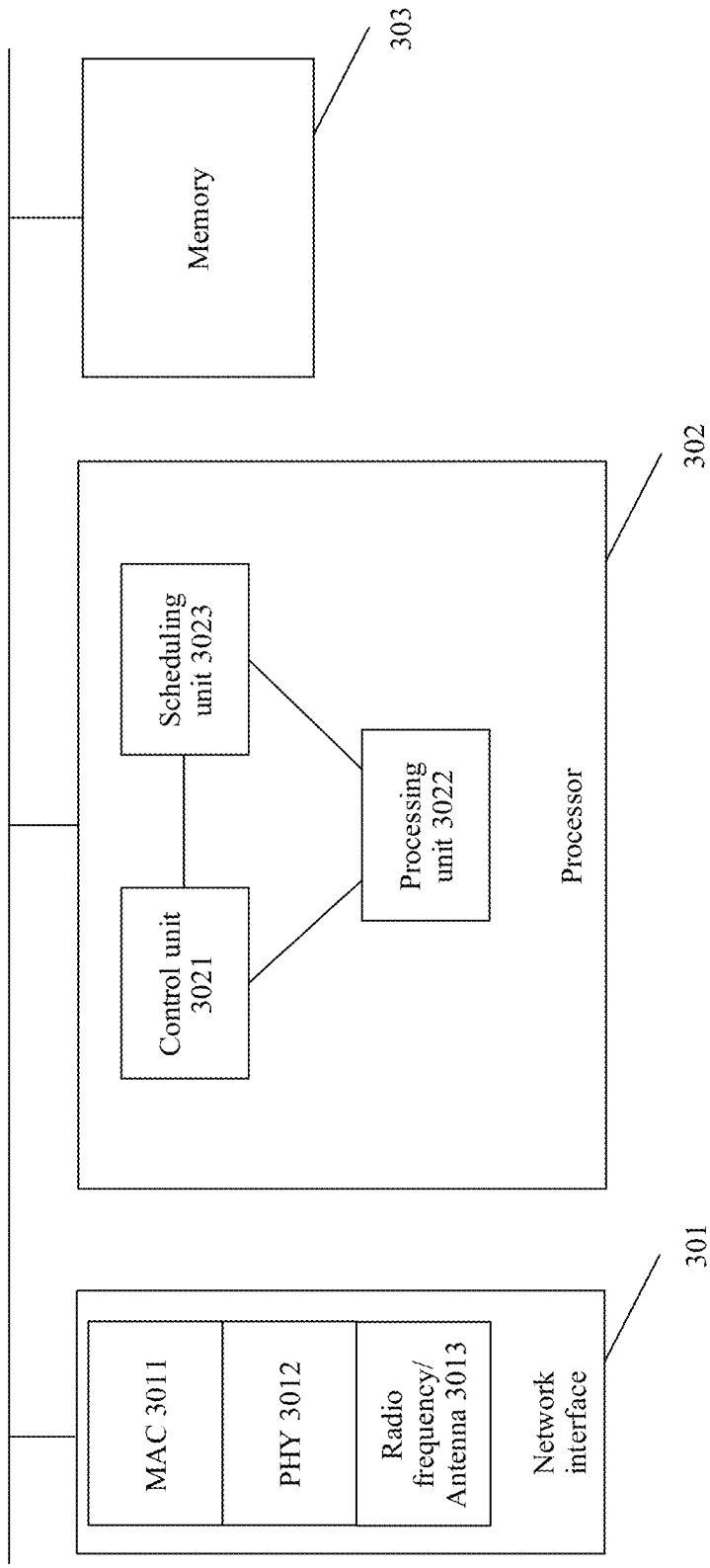
FIG. 3 is a block diagram of a receive end according to an embodiment of this application.

As shown in FIG. 3, the receive end may include at least a network interface 301, a processor 302, and a memory 303. The network interface 301 is configured to send and receive a data packet, and may include an Ethernet media access controller (MAC) 3011, a physical interface transceiver (Port Physical Layer, PHY) 3012, a radio frequency/antenna 3013, and the like. The processor 302 is configured to process an operation corresponding to data transmission. Optionally, the processor 302 may include a control unit 3021, a processing unit 3022, and a scheduling unit 3023. The control unit 3021 is configured to control execution of an operation corresponding to signaling information; the processing unit 3022 is configured to parse the signaling information, process related data, and the like; and the scheduling unit 3023 is configured to determine transmission resources, used modulation parameters, and the like for different data. The memory 303 is configured to store service data, signaling information, a preset value, and the like that are received or sent through the network interface 301.

Figure 4:
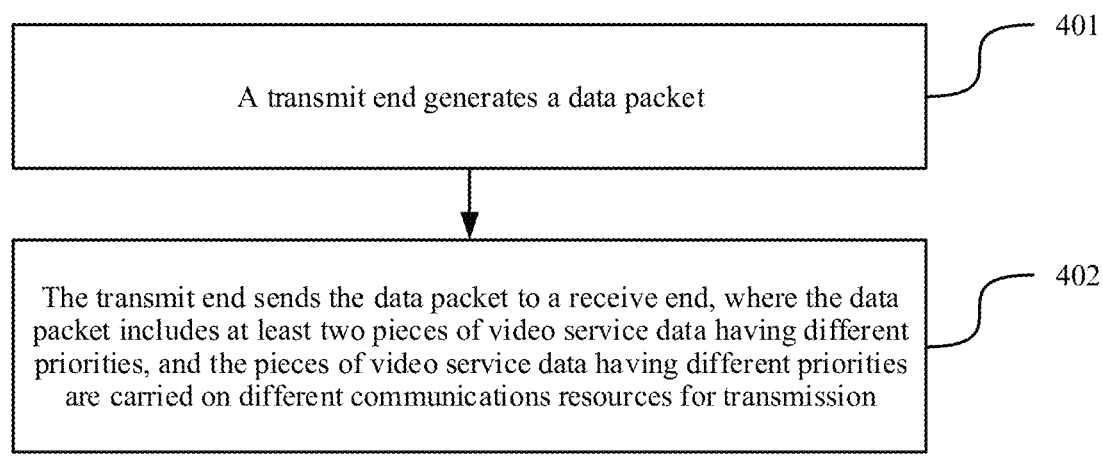
FIG. 4 is a schematic flowchart of a data transmission method according to an embodiment of this application.

With reference to a specific implementation, the following describes in detail a processing procedure shown in FIG. 4. Content may be as follows:

Step 401: A transmit end generates a data packet.

The data packet is a physical layer data packet, may be referred to as a data packet, and generally, is also referred to as a physical layer protocol data unit (PPDU). Each data packet includes a preamble and a data field. The data field may include a plurality of different physical layer service data units (PSDUs), and each PSDU is obtained by encapsulating video service data. A main function of the preamble is to assist in data field transmission, and the preamble carries information such as a transmission parameter of the data field, so that the receive end parses the data field. The preamble may include a plurality of different fields, and the field may include information such as resource unit allocation information, modulation and coding, and a spatial stream, so that the data field in the data packet can be sent on a corresponding communications resource and received by the receive end on the corresponding communications resource. The following briefly describes different fields in the preamble.

FIG. 5 is used as an example. Fields in the preamble may include a legacy short training field (L-STF), a legacy long training field (L-LTF), a legacy signal field (L-SIG), a symbol for auto-detection, an extremely high throughput signal field A (EHT-SIG-A), an extremely high throughput signal field B (EHT-SIG-B), an extremely high throughput short training field (EHT-STF), an extremely high throughput long training field (EHT-LTF), and packet extension (PE).

Pieces of video service data in the foregoing data packet may be allocated a plurality of different priorities. There may be a plurality of classification rules for a priority of video service data. For example, the priority of the video service data is a level obtained by classifying the video service data based on importance of the video service data. Greater importance of the video service data indicates a higher priority of the video service data. The following lists several feasible priority classification manners.

(1) Determine a Priority of Each Piece of Video Service Data Based on a Data Type of the Video Service Data.

Three types of frames are defined in the important video coding standard H.264: an I-frame, where the I-frame is a completely coded video frame, and is also referred to as a key frame; a P-frame, where the P-frame is a video frame that is generated by referring to a previous I-frame and that includes only a coded different part, and is also referred to as a prediction frame; and a B-frame, where the B-frame is a video frame that is coded by referring to adjacent frames before and after the B-frame, and is also referred to as a bidirectional prediction frame. Comparatively speaking, the I-frame is more important than the P-frame and the B-frame. Therefore, generally, a priority of the I-frame may be higher than a priority of the P-frame and a priority of the B-frame.

There are a plurality of methods for priority classification based on a data type of video service data, and a feasible classification manner may be to perform classification by using an I-frame, a P-frame, and a B-frame. A manner in which data types of video service data are classified based on an I-frame, a P-frame, and a B-frame is used as an example to describe several feasible priority determining manners. In a first manner, the I-frame corresponds to a first priority, the P-frame corresponds to a second priority, and the B-frame corresponds to a third priority. In a second manner, the I-frame corresponds to a first priority, and the B-frame and the P-frame correspond to a second priority. The first priority is higher than the second priority, and the second priority is higher than the third priority. When a correspondence table is used for representation, the following Table 1 and Table 2 may be respectively used to represent the foregoing two manners.

TABLE 1

| I-frame | First priority |
| --- | --- |
| P-frame | Second priority |
| B-frame | Third priority |

TABLE 2

| I-frame | First priority |
| --- | --- |
| B-frame and P-frame | Second priority |

In this way, if a correspondence in Table 1 is used, a priority of each piece of video service data is determined as follows: If the video service data is an I-frame, it is determined that the priority of the video service data is a first priority; if the video service data is a P-frame, it is determined that the priority of the video service data is a second priority; or if the video service data is a B-frame, it is determined that the priority of the video service data is a third priority. In this case, when video service data is grouped according to a preset grouping rule, each data packet includes at least two of an I-frame, a P-frame, and a B-frame.

If a correspondence in Table 2 is used, a priority of each piece of video service data is determined as follows: If the video service data is an I-frame, it is determined that the priority of the video service data is a first priority; or if the video service data is a P-frame or a B-frame, it is determined that the priority of the video service data is a second priority.

In this case, when video service data is grouped according to a preset grouping rule, each data packet includes any combination of: an I-frame and a P-frame, an I-frame and a B-frame, or an I-frame, a P-frame, and a B-frame.

It should be noted that the method for classifying priorities of video service data based on the I-frame, the P-frame, and the B-frame is merely an example of a classification manner. In addition, another classification manner may alternatively be used for classifying priorities. This is not limited in this embodiment of this application.

(2) Determine a Priority of Video Service Data Based on Whether the Video Service Data is Retransmitted Video Service Data or Newly-Transmitted Video Service Data.

In a data transmission process, because a network is unstable, a packet loss may occur, and lost video service data needs to be retransmitted. Retransmitted video service data and newly-transmitted video service data may be classified as video service data having different priorities. To ensure transmission quality of the retransmitted video service data, a priority of the retransmitted video service data may be set to be higher than a priority of the newly-transmitted video service data.

It should be noted that the foregoing provides only two feasible priority classification manners listed in this embodiment of this application. In addition, there may be another classification manner. This is not limited in this application.

Step 402: The transmit end sends the data packet to a receive end, where the data packet includes at least two pieces of video service data having different priorities, and the pieces of video service data having different priorities are carried on different communications resources for transmission.

The communications resource is a carrier for data transmission, and may include a frequency domain resource, a spatial resource, a time-frequency resource, and the like. In this embodiment of this application, the communications resource mainly includes a frequency domain resource and a spatial resource. The frequency domain resource may include a resource unit (RU) and a frequency band. The spatial resource may be a spatial stream, and a quantity of spatial streams M is generally less than or equal to a quantity of transmit antennas or receive antennas. If the quantity of transmit antennas is not equal to the quantity of receive antennas, the quantity of spatial streams M is equal to or less than a smaller quantity of the quantity of transmit antennas and the quantity of receive antennas.

A method for determining that the pieces of video service data having different priorities are carried on different communications resources for transmission is described as follows:

determining, based on a correspondence between a communications resource and a priority of video service data, that the pieces of video service data having different priorities are carried on different communications resources for transmission. The correspondence between a communications resource and a priority of video service data may be determined based on transmission performance of the communications resource. The transmission performance of the communications resource may be used to measure transmission quality of service data transmitted on the communications resource. A communications resource with higher transmission performance indicates higher transmission quality of video service data carried on the communications resource. The transmission performance of the communications resource may be determined in a plurality of manners. In a feasible manner, the transmission performance of the communications resource is determined based on feedback information of the receive end. The feedback information of the receive end may include a plurality of types, for example, a sounding signal, an indication bit, and channel quality of a channel. This is not limited in this application. The transmit end determines, based on the pieces of video service data having different priorities and the correspondence between a communications resource and a priority of video service data, a communications resource corresponding to each of the pieces of video service data having different priorities, so that the pieces of video service data having different priorities are carried on different communications resources for transmission. To preferentially ensure transmission quality of video service data having a high priority, a feasible manner is that, in the correspondence between a communications resource and a priority of video service data, video service data with a higher priority corresponds to a communications resource with higher transmission performance.

Optionally, to facilitate transmission of the pieces of video service data having different priorities, indication information of the different communications resources may be generated, and each piece of indication information is used to indicate video service data carried on a corresponding communications resource. The indication information of the different communications resources may be carried in the preamble of the data packet. In an optional manner, the EHT-SIG-B field of the preamble carries the indication information of the different communications resources. Based on indication information of each communications resource, the pieces of video service data having different priorities are carried on different communications resources for transmission.

Optionally, pieces of video service data having a plurality of priorities one-to-one correspond to a plurality of service identifiers or a plurality of access categories. Based on service identifiers or access categories corresponding to the pieces of video service data having different priorities, the pieces of video service data having different priorities are carried on different communications resources for transmission. The access categories may include a video service (AC_Video, AC_VI), a voice service (AC_Voice, AC_VO), a best-effort transmission service (AC_Best Effort, AC_BE), and a background service (AC_Background, AC_BK). Contention-based transmission capabilities of the four access categories decrease in descending order. To preferentially ensure transmission quality of video service data having a high priority, an optional manner is that, the video service data having a high priority corresponds to a service identifier or an access category with a relatively strong resource contention capability, and video service data having a low priority corresponds to a service identifier or an access category with a relatively weak resource contention capability.

It should be noted that the foregoing several listed manners are merely example implementations in this application. In addition, there may be another implementation. This is not limited in this application.

After step 402, after the transmit end enables the pieces of video service data having different priorities to be carried on different communications resources for transmission, the receive end receives the data packet including the pieces of video service data. If the video service data having a high priority and the video service data having a low priority are correctly received, the receive end combines the video service data having a high priority and the video service data having a low priority. If only the video service data having a high priority is received and the video service data having a low priority is not correctly received, the receive end may discard the video service data having a low priority, or may feed back a retransmission request to the transmit end and wait until the transmit end retransmits the video service data having a low priority. This is not limited in this application.

Figure 6:
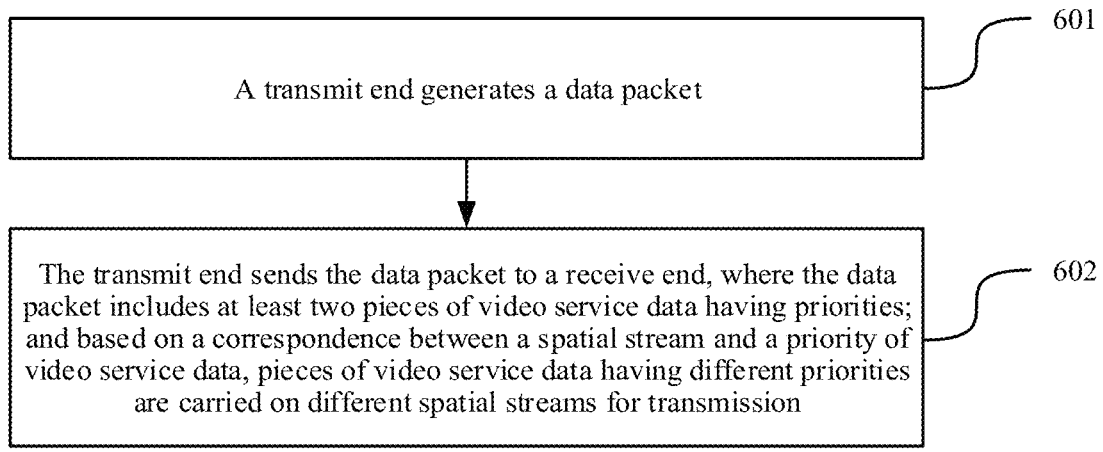
FIG. 6 is a schematic flowchart of a data transmission method according to an embodiment of this application.

An embodiment of this application further provides a data transmission method. In this embodiment, a communications resource is a spatial stream, and a correspondence between a communications resource and a priority of video service data includes a correspondence between a spatial stream and a priority of video service data. The following provides a description with reference to FIG. 6.

Step 601: A transmit end generates a data packet.

Step 602: The transmit end sends the data packet to a receive end, where the data packet includes at least two pieces of video service data having priorities; and based on the correspondence between a spatial stream and a priority of video service data, pieces of video service data having different priorities are carried on different spatial streams for transmission.

There may be a plurality of spatial streams in a multiple-input multiple-output (MIMO) system. The correspondence between a spatial stream and a priority of video service data may be determined by the transmit end based on feedback information sent by the receive end. Based on different feedback information, the correspondence may be determined in a plurality of different manners. The following lists several feasible manners.

Manner 1: The feedback information includes a sounding signal, and the correspondence between a spatial stream and a priority of video service data is determined by the transmit end based on received signal powers of the sounding signal that are detected by a plurality of transmit antennas of the transmit end.

The sounding signal may be a signal dedicated for channel detection, or may be a signal for sending conventional service data, or the like. The sounding signal may be periodically sent, or may be sent after being triggered by a preset event. In Manner 1, the sounding signal is a signal transmitted by the receive end to the transmit end.

The following briefly describes a method in which the transmit end determines, based on the sounding signal transmitted by the receive end, the correspondence between a spatial stream and a priority of video service data.

A data transmission channel is established between each antenna of the transmit end and each antenna of the receive end. The receive end transmits the sounding signal to the transmit end through each channel of each antenna. Each transmit antenna of the transmit end receives the sounding signal through different channels, determines channel state information for receiving the sounding signal through the different channels, then determines, based on the channel state information of the different channels, a power at which the transmit antenna receives the sounding signal on each channel, and determines a sum of powers at which the transmit antenna receives the sounding signal on all corresponding channels, that is, a received signal power of the sounding signal detected by each transmit antenna. A value relationship between received signal powers of different transmit antennas is determined, and a correspondence between a spatial stream of a transmit antenna and a priority of video service data is determined. To ensure transmission quality of video service data having a high priority, a correspondence between a spatial stream and a priority may be that a spatial stream of a transmit antenna with a high received signal power corresponds to a high priority, and a spatial stream of a transmit antenna with a low received signal power corresponds to a low priority.

Figure 7:
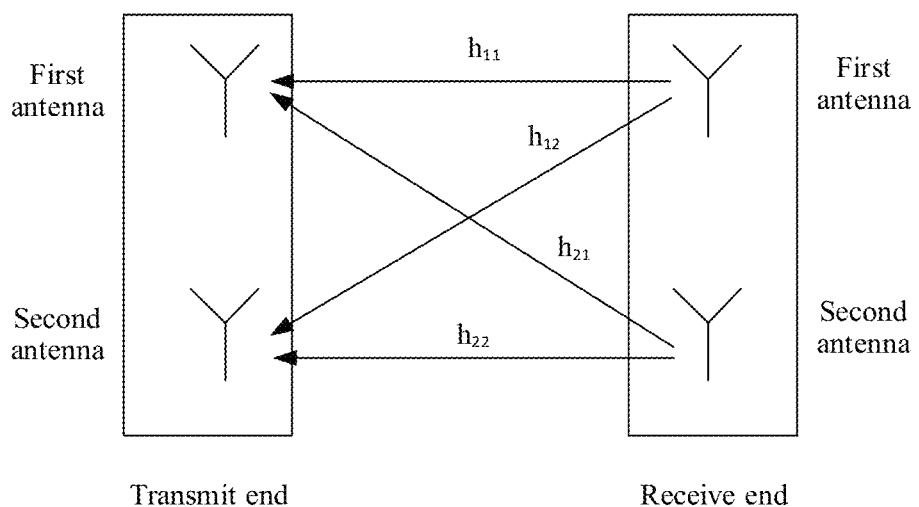
FIG. 7 is a schematic diagram of a data transmission scenario according to an embodiment of this application.

For example, as shown in FIG. 7, the transmit end sends video service data by using two antennas. Based on the apparatus, a manner for determining the received signal powers of the plurality of transmit antennas of the transmit end may be as follows: The receive end sends the sounding signal to the transmit end, and the transmit end determines, based on the received sounding signal, that a channel matrix is $$H_1 = \begin{bmatrix} h_{11} & h_{12} \\ h_{21} & h_{22} \end{bmatrix},$$

where $h_{11}$ represents a channel from a first receive antenna to a first transmit antenna, $h_{12}$ represents a channel from the first receive antenna to a second transmit antenna, $h_{21}$ represents a channel from a second receive antenna to the first transmit antenna, and $h_{22}$ represents a channel from the second receive antenna to the second transmit antenna.

Based on the foregoing channel matrix, it may be determined that a received signal power of the first transmit antenna may be $P_1=|h_{\_11}|^2|h_{\_21}|^2$, and a received signal power of the second transmit antenna may be $P_2=|h_{\_12}|^2|h_{\_22}|^2$. It is assumed that pieces of to-be-sent video service data are allocated two priorities, for example, an I-frame corresponds to a first priority, and a P-frame and a B-frame correspond to a second priority. If $P_1>P_2$, it is determined that the correspondence between a spatial stream and a priority of video service data is that a spatial stream of the first transmit antenna corresponds to video service data having the first priority, and a spatial stream of the second transmit antenna corresponds to video service data having the second priority. If $P_1<P_2$, it is determined that the correspondence between a spatial stream and a priority of video service data is that a spatial stream of the second transmit antenna corresponds to video service data having the first priority, and a spatial stream of the first transmit antenna corresponds to video service data having the second priority.

Manner 2: The feedback information includes a power value of each transmit antenna.

A power value of a transmit antenna is a sum of powers of a sounding signal sent by the transmit antenna on all channels and received by the receive end. A method for determining a power value of a transmit antenna may include: The transmit end sends a sounding signal to the receive end; and when receiving the sounding signal, the receive end may determine a power for receiving the sounding signal on each channel, and based on all channels corresponding to the transmit antenna, the receive end determines a sum of received powers of the transmit antenna on all the channels, that is, determines the power value of the transmit antenna.

Based on received signal powers of a plurality of transmit antennas of the transmit end, there are a plurality of methods for establishing the correspondence between a spatial stream and a priority. To ensure transmission quality of video service data having a high priority, in an optional manner, a spatial stream corresponding to a transmit antenna with a relatively high received signal power corresponds to a high priority, and a spatial stream corresponding to a transmit antenna with a relatively low received signal power corresponds to a low priority.

Figure 8:
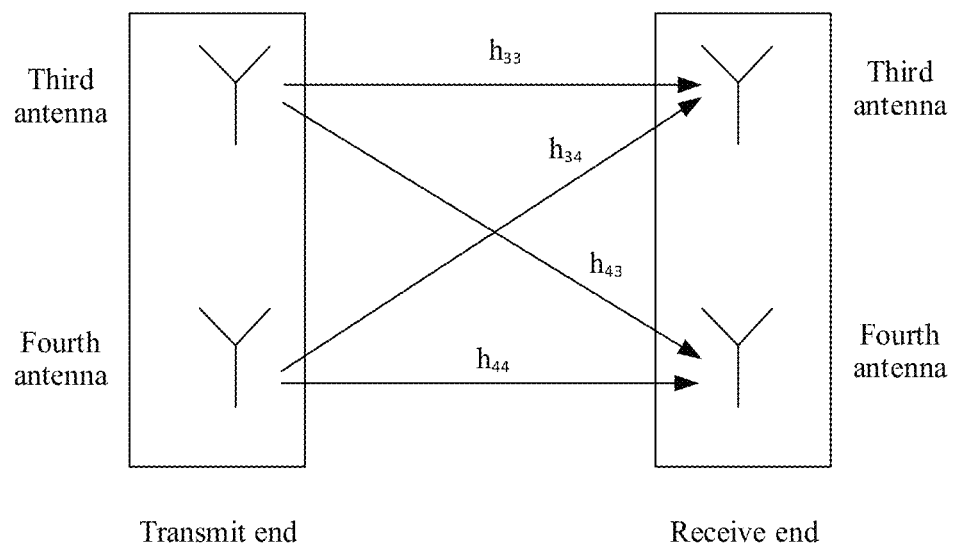
FIG. 8 is a schematic diagram of a data transmission scenario according to an embodiment of this application.

For example, as shown in FIG. 8, the transmit end sends video service data by using two antennas. Based on the apparatus, a manner for determining a power value of each transmit antenna may be as follows: The transmit end sends a sounding signal to the receive end, and the receive end determines, based on the received sounding signal, that a channel matrix is $$H_2 = \begin{bmatrix} h_{33} & h_{34} \\ h_{43} & h_{44} \end{bmatrix},$$

where $h_{33}$ represents a channel from a third transmit antenna to a third receive antenna, $h_{34}$ represents a channel from the third transmit antenna to a fourth receive antenna, $h_{43}$ represents a channel from a fourth transmit antenna to the third receive antenna, and $h_{44}$ represents a channel from the fourth transmit antenna to the fourth receive antenna.

Based on the foregoing channel matrix, it may be determined that a power value of the third transmit antenna may be $P_3=|h_{\_33}|^2|h_{\_34}|^2$, and a power value of the fourth transmit antenna may be $P_4=|h_{\_43}|^2|h_{\_44}|^2$. The receive end sends $P_3$ and $P_4$ to the receive end, and the receive end compares $P_3$ and $P_4$. It is assumed that pieces of to-be-sent video service data are allocated two priorities, for example, an I-frame corresponds to a first priority, and a P-frame and a B-frame correspond to a second priority. If $P_3 > P_4$, it is determined that the correspondence between a spatial stream and a priority of video service data is that a spatial stream of the third transmit antenna corresponds to video service data having the first priority, and a spatial stream of the fourth transmit antenna corresponds to video service data having the second priority. If $P_3 < P_4$, it is determined that the correspondence between a spatial stream and a priority of video service data is that a spatial stream of the fourth transmit antenna corresponds to video service data having the first priority, and a spatial stream of the third transmit antenna corresponds to video service data having the second priority.

Manner 3: The feedback information includes one or more indication bits, and the indication bit is used to indicate a correspondence between an antenna and a priority of video service data.

Case 1: The feedback information includes a plurality of indication bits.

One of the plurality of indication bits corresponds to one of a plurality of frequency bands, and the one indication bit is used to indicate a correspondence that is between an antenna and a priority of video service data and that is on the one frequency band. One indication bit may be represented by using one bit, each bit corresponds to one frequency band, and each bit is used to indicate a correspondence that is between an antenna and a priority and that is on the corresponding frequency band. A value of each bit may include 0 or 1, and 0 and 1 correspond to different correspondences between an antenna and a priority. One indication bit may alternatively be represented by using a plurality of bits, the one indication bit corresponding to the plurality of bits corresponds to one frequency band, and values of the plurality of bits jointly indicate correspondences that are between an antenna and a priority and that are on different frequency bands. For example, assuming that two bits represent one indication bit, 00, 01, 10, and 11 may indicate different correspondences that are between an antenna and a priority and that are on a frequency band. The receive end generates a corresponding indication bit based on a power value of each transmit antenna on each frequency band and based on a correspondence that is between an antenna and a priority and that corresponds to a value of the indication bit. After receiving the indication bit, the transmit end determines a correspondence that is between an antenna and a priority and that is on each frequency band.

Figure 9:
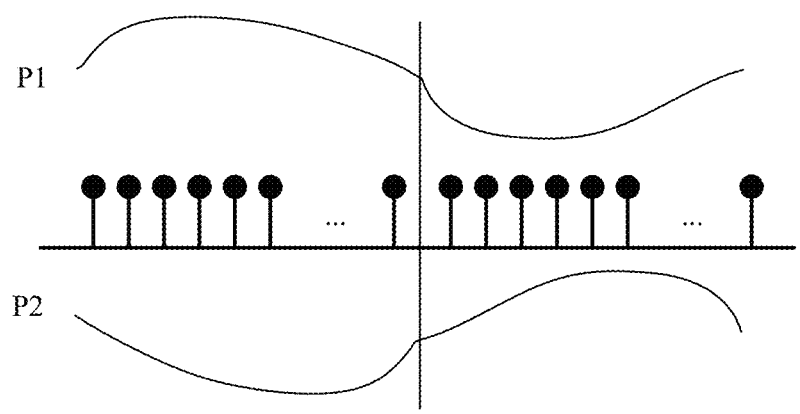
FIG. 9 is a schematic diagram of a data transmission scenario according to an embodiment of this application.

For example, if video service data is sent in an orthogonal frequency division multiplexing (OFDM) mode, relationships between power values of different transmit antennas on different frequency bands may be different. FIG. 9 is used as an example. Based on a frequency domain selection characteristic of a frequency domain channel, on the left frequency band, a power value of the first transmit antenna is greater than a power value of the second transmit antenna, and on the right frequency band, a power value of the first transmit antenna is less than a power value of the second transmit antenna. Based on the frequency domain selection feature of the frequency domain channel, different frequency bands may correspond to different indication bits. It is assumed that the transmit end notifies the receive end that the video service data having the first priority and the video service data having the second priority are sent in a hierarchical manner such as 2×2 MIMO, and it is assumed that each channel is evenly divided into N frequency bands, and the indication bit is in a form of a bitmap. In this case, the receive end feeds back, in a bitmap manner, correspondences that are between an antenna and a priority of video service data and that are on different frequency bands. The transmit end sends a sounding signal to the receive end, and the receive end determines a power value relationship that is between the first transmit antenna and the second transmit antenna and that is on each frequency band, where a power value of the transmit antenna is a received power at which the receive end receives the sounding signal sent by the transmit antenna. If a power value of the first transmit antenna is greater than a power value of the second transmit antenna, it may be determined that the first transmit antenna corresponds to a high priority, and the second transmit antenna corresponds to a low priority. In this case, it is determined that an indication bit corresponding to the frequency band is 1. If a power value of the first transmit antenna is less than a power value of the second transmit antenna, it may be determined that the second transmit antenna corresponds to a high priority, and the first transmit antenna corresponds to a low priority. In this case, it is determined that an indication bit corresponding to the frequency band is 0.

The receive end sends a determined bitmap and a quantity N of frequency bands to the transmit end. After the transmit end receives the bitmap and the quantity N of frequency bands, for a bit value corresponding to each frequency band, if the bit value is 1, it indicates that on the frequency band, the first transmit antenna corresponds to a high priority, and the second transmit antenna corresponds to a low priority; or if the bit value is 0, the second transmit antenna corresponds to a high priority, and the first transmit antenna corresponds to a low priority.

Case 2: The feedback information includes one indication bit.

The indication bit corresponds to an entire frequency domain resource between the transmit end and the receive end, and the indication bit is used to indicate a correspondence between an antenna and a priority of video service data. The indication bit may be represented by using one bit, and the bit is used to indicate the correspondence between an antenna and a priority. A value of the bit may include 0 or 1, and 0 and 1 correspond to different correspondences between an antenna and a priority. The indication bit may alternatively be represented by using a plurality of bits, and values of the plurality of bits jointly indicate the correspondence between an antenna and a priority. For example, assuming that two bits represent one indication bit, 00, 01, 10, and 11 may indicate different correspondences between an antenna and a priority. The receive end generates a corresponding indication bit based on a power value of each transmit antenna and based on a correspondence that is between an antenna and a priority and that corresponds to a value of the indication bit. After receiving the indication bit, the transmit end determines the correspondence between an antenna and a priority.

Manner 4: The feedback information includes one or more indication bits, and the indication bit is used to indicate a relationship between transmission performance levels of different transmit antennas.

Case 1: The feedback information includes a plurality of indication bits.

One of the plurality of indication bits corresponds to one of a plurality of frequency bands, and the one indication bit is used to indicate a relationship that is between transmission performance levels of different transmit antennas and that is on the one frequency band. Transmission performance of the transmit antenna may be determined based on a power at which the receive end receives a sounding signal sent by the transmit antenna. One indication bit may be represented by using one bit, each bit corresponds to one frequency band, and each bit is used to indicate a relationship between transmission performance levels of different transmit antennas. A value of each bit may include 0 or 1, and 0 and 1 correspond to relationships between transmission performance levels of different transmit antennas. For example, a relationship between transmission performance levels that corresponds to 0 is that transmission performance of the first transmit antenna is higher than transmission performance of the second transmit antenna; and a relationship between transmission performance levels that corresponds to 1 is that transmission performance of the first transmit antenna is lower than transmission performance of the second transmit antenna. One indication bit may alternatively be represented by using a plurality of bits, the one indication bit corresponding to the plurality of bits corresponds to one frequency band, and values of the plurality of bits jointly indicate a relationship that is between transmission performance levels of different transmit antennas and that is on the one frequency band. For example, assuming that two bits represent one indication bit, 00, 01, 10, and 11 may indicate different relationships that are between transmission performance levels of different transmit antennas and that are on a frequency band. The receive end generates a corresponding indication bit based on a relationship that is between transmission performance levels and that corresponds to the indication bit and based on relationships that are between transmission performance levels of different transmit antennas and that are on different frequency bands. After receiving the indication bit, the transmit end determines a relationship that is between transmission performance levels of different transmit antennas and that corresponds to the indication bit, and further determines the correspondence between a spatial stream and a priority of video service data.

Case 2: The feedback information includes one indication bit.

The one indication bit corresponds to an entire frequency band between the transmit end and the receive end, and the one indication bit is used to indicate a relationship between transmission performance levels of different transmit antennas. Transmission performance of the transmit antenna may be determined based on a power at which the receive end receives a sounding signal sent by the transmit antenna. The indication bit may be represented by using one bit, and the bit is used to indicate the relationship between transmission performance levels of different transmit antennas. A value of the bit may include 0 or 1, and 0 and 1 correspond to relationships between transmission performance levels of different transmit antennas. The indication bit may alternatively be represented by using a plurality of bits, and values of the plurality of bits jointly indicate the relationship between transmission performance levels of different transmit antennas. For example, assuming that two bits represent one indication bit, 00, 01, 10, and 11 may indicate relationships that are between transmission performance levels of different transmit antennas and that are on a frequency band.

It should be noted that, in addition to the foregoing representation manners, the indication bit may be represented in a plurality of other manners. For example, a power value of each transmit antenna is used to represent the indication bit, or an identifier of an antenna with a highest power value in transmit antennas is used to represent the indication bit. This is not limited in this application.

Manner 5: The feedback information includes a channel matrix.

The receive end performs channel estimation to obtain a channel matrix, and the receive end sends the channel matrix to the transmit end. A channel estimation method may be as follows: The transmit end sends a sounding signal to the receive end, and after receiving the sounding signal, the receive end determines a channel matrix of all channels between each transmit antenna and each receive antenna based on the received sounding signal.

After receiving the channel matrix, the transmit end determines a precoding matrix based on the channel matrix. For example, the transmit end may obtain the precoding matrix by performing singular value decomposition (SVD) on the channel matrix, as shown in the following formula (1):

$$H=U*S*V \qquad (1)$$

H represents the channel matrix, and both U and V represent unitary matrices, and S represents a diagonal matrix. Assuming that the transmit end uses two antennas to send video service data, S may be expressed as $$\begin{bmatrix} s_1 & 0 \\ 0 & s_2 \end{bmatrix}.$$

V represents the precoding matrix, and S may represent a virtual equivalent channel matrix obtained after the receive end performs equalization processing on the signal. A relationship between signal quality levels of different transmit antennas can be roughly determined based on a relationship between singular values $S_1$ and $S_2$ in S.

If $S_1 > S_2$, it indicates that signal quality of the first transmit antenna is higher than signal quality of the second transmit antenna. In this case, it is determined that the correspondence between a spatial stream and a priority of video service data is that a spatial stream of the first transmit antenna corresponds to video service data having a high priority, and a spatial stream of the second transmit antenna corresponds to video service data having a low priority.

If $S_1 < S_2$, it indicates that signal quality of the first transmit antenna is lower than signal quality of the second transmit antenna. In this case, it is determined that the correspondence between a spatial stream and a priority of video service data is that a spatial stream of the first transmit antenna corresponds to video service data having a low priority, and a spatial stream of the second transmit antenna corresponds to video service data having a high priority.

When sending the video service data included in the data packet, the transmit end precodes the video service data based on the precoding matrix V. It is assumed that the data packet includes video service data having two priorities, video service data having a high priority is represented by x, and video service data having a low priority is represented by y. If $S_1 > S_2$, a sequence of sending the video service data having two priorities may be $$V^* \begin{bmatrix} x \\ y \end{bmatrix}.$$

If $S_1 < S_2$, a sequence of sending the video service data having two priorities may be $$V^* \begin{bmatrix} y \\ x \end{bmatrix}.$$

Manner 6: The feedback information includes a sounding signal, and the correspondence between a spatial stream and a priority of video service data is determined by the transmit end based on channel state information that is of each channel and that is detected by a plurality of transmit antennas.

The receive end sends a sounding signal to the transmit end, the transmit end detects channel state information of each channel based on each transmit antenna to obtain a channel matrix, and determines a precoding matrix based on the channel matrix. For example, the transmit end may obtain the precoding matrix and a diagonal matrix by performing SVD on the channel matrix. For corresponding processing, refer to SVD processing in Manner 5. Details are not described herein again.

The transmit end determines the precoding matrix and the diagonal matrix, and determines a relationship between signal quality levels of different transmit antennas based on a relationship between eigenvalues in the diagonal matrix. The correspondence between a spatial stream and a priority of video service data is determined based on the relationship between signal quality levels of different transmit antennas. For corresponding processing, refer to processing for establishing the correspondence in Manner 5. Details are not described herein again.

It should be noted that there may be another manner in addition to the foregoing several listed manners. This is not limited in this application. In addition, the video service data in the foregoing embodiment is merely an example in this embodiment. In addition to the video service data, this embodiment of this application may further implement transmission of another type of service data. For example, the service data may be voice service data. This is not limited in this embodiment of this application.

Figure 10:
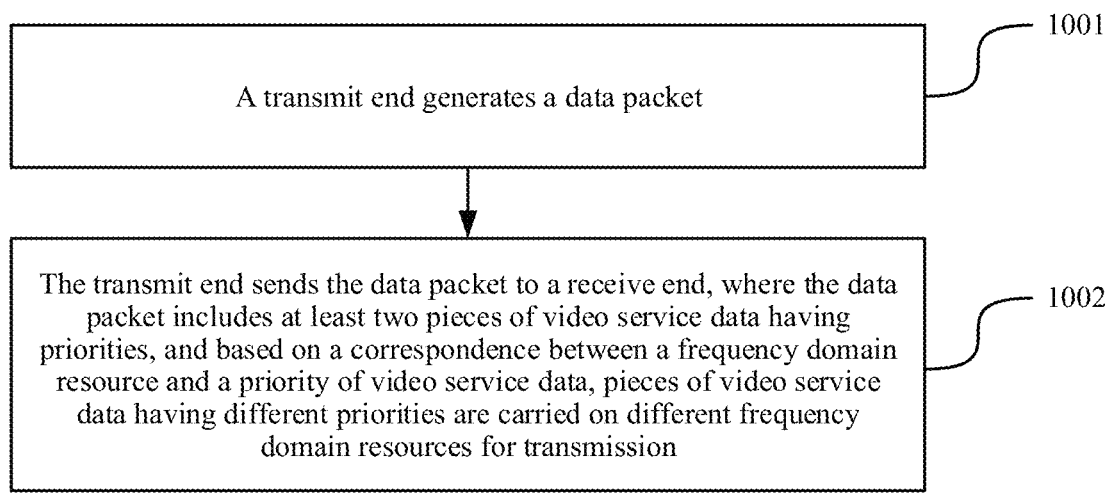
FIG. 10 is a schematic flowchart of a data transmission method according to an embodiment of this application.

An embodiment of this application further provides a data transmission method. In this embodiment, a communications resource is a frequency domain resource, and a correspondence between a communications resource and a priority of video service data may include a correspondence between a frequency domain resource and a priority of video service data. The following provides a description with reference to FIG. 10.

Step 1001: A transmit end generates a data packet.

Step 1002: The transmit end sends the data packet to a receive end, where the data packet includes at least two pieces of video service data having priorities, and based on the correspondence between a frequency domain resource and a priority of video service data, pieces of video service data having different priorities are carried on different frequency domain resources for transmission.

The frequency domain resource may include an RU, and the correspondence between a frequency domain resource and a priority of video service data may be a correspondence between an RU and a priority of video service data. The correspondence between an RU and a priority of video service data is determined based on a correspondence between a transmission capability of an RU and a priority. To preferentially ensure transmission quality of video service data having a high priority, the correspondence between an RU and a priority of video service data may include: An RU with a high transmission capability corresponds to a high priority, and an RU with a low transmission capability corresponds to a low priority. There may be a plurality of methods for determining the transmission capability of the RU. A feasible manner is that the transmit end determines the transmission capability based on feedback information sent by the receive end. For example, the feedback information is a power for receiving a sounding signal on each RU. A method for determining the transmission capability of the RU may be as follows: The transmit end sends a sounding signal to the receive end; when receiving the sounding signal, the receive end determines a power for receiving the sounding signal on each RU; the receive end sends, to the transmit end, the power for receiving the sounding signal on each RU; and the transmit end determines the transmission capability of the RU based on the power. For example, the feedback information is a sounding signal. A method for determining the transmission capability of the RU may be as follows: The receive end sends a sounding signal to the transmit end; and when receiving the sounding signal, the transmit end determines a power for receiving the sounding signal on each RU, to further determine a transmission capability of each RU. In addition, the transmission capability of the RU may alternatively be determined by using another method. This is not limited in this application.

Figure 11:
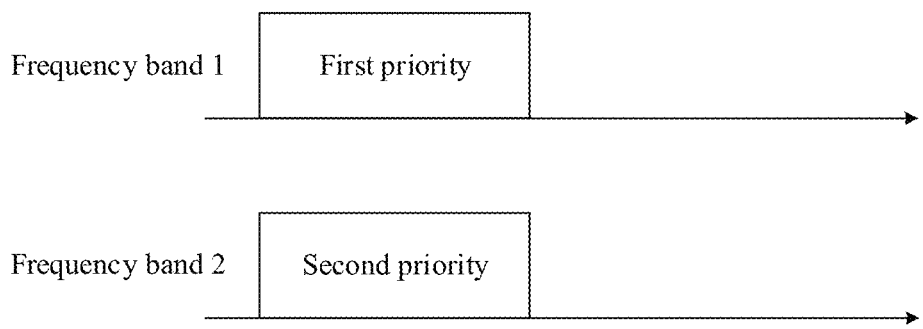
FIG. 11 is a schematic diagram of a data transmission scenario according to an embodiment of this application.

The frequency domain resource may alternatively include a frequency band. As shown in FIG. 11, the correspondence between a frequency domain resource and a priority of video service data may be a correspondence between a frequency band and a priority of video service data. The correspondence between a frequency band and a priority of video service data is determined based on a correspondence between a transmission capability of a frequency band and a priority. To preferentially ensure transmission quality of video service data having a high priority, the correspondence between a frequency band and a priority of video service data may include: A frequency band with a high transmission capability corresponds to a high priority, and a frequency band with a low transmission capability corresponds to a low priority. There may be a plurality of methods for determining the transmission capability of the frequency band. A feasible manner is that the transmit end determines the transmission capability based on feedback information sent by the receive end. The feedback information may include signal quality of each frequency band, a received signal power for receiving a sounding signal on each frequency band, or the like.

Figure 12:
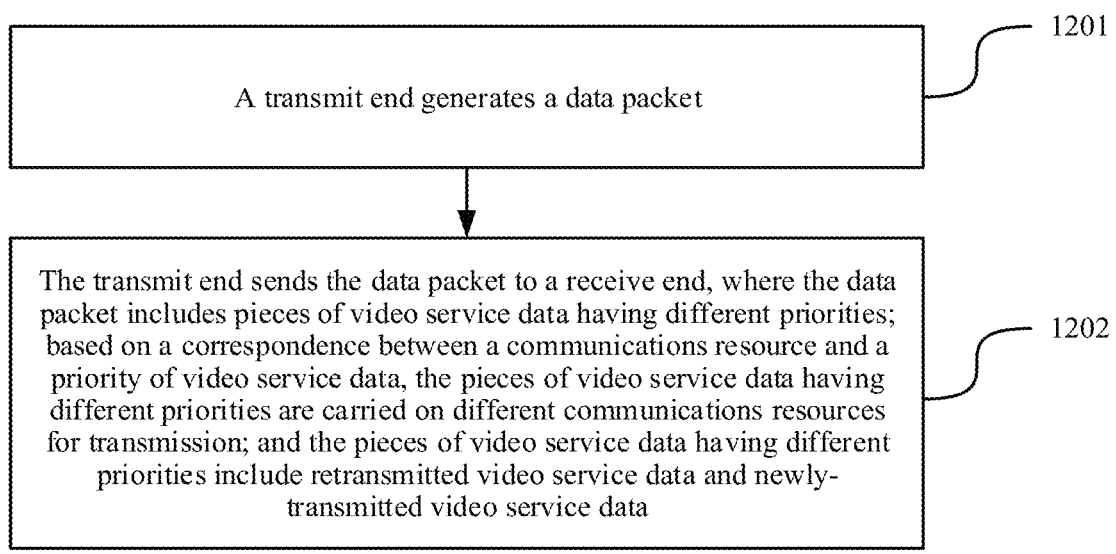
FIG. 12 is a schematic structural diagram of a data packet according to an embodiment of this application.

An embodiment of this application further provides a data transmission method. In this embodiment, pieces of service data having different priorities include retransmitted service data and newly-transmitted service data. The following provides a description with reference to FIG. 12.

Step 1201: A transmit end generates a data packet.

Step 1202: The transmit end sends the data packet to a receive end, where the data packet includes pieces of service data having different priorities; based on a correspondence between a communications resource and a priority of service data, the pieces of service data having different priorities are carried on different communications resources for transmission; and the pieces of service data having different priorities include retransmitted service data and newly-transmitted service data.

Figure 13:
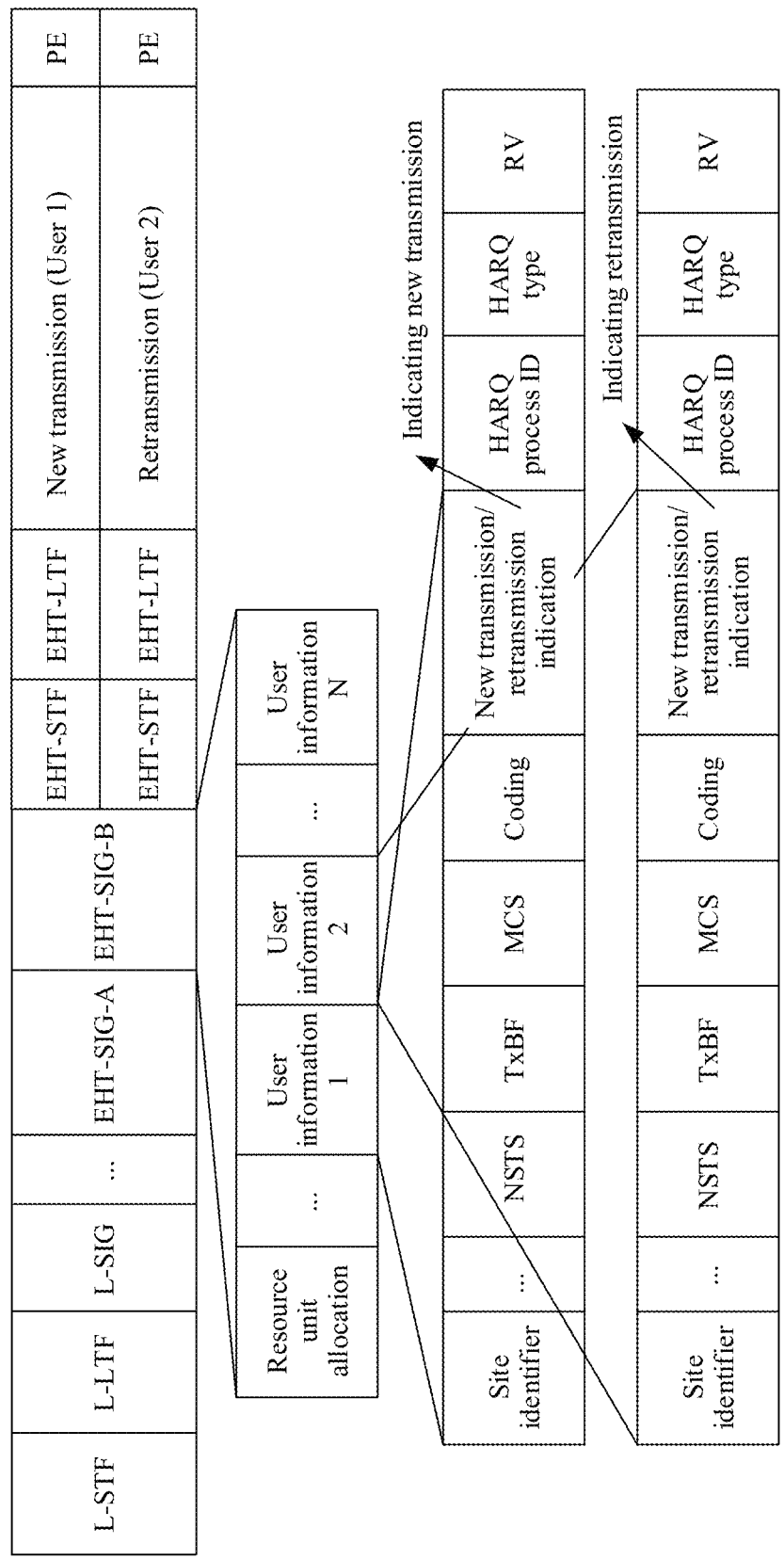
FIG. 13 is a schematic diagram of a data transmission scenario according to an embodiment of this application.

A data field in the data packet includes the retransmitted service data and the newly-transmitted service data, a preamble in the data packet may include a plurality of fields, at least one field may include indication information, and the indication information is used to indicate that each piece of service data is retransmitted service data or newly-transmitted service data. Optionally, as shown in FIG. 13, the fields in the preamble may include an L-STF, an L-LTF, an L-SIG field, an EHT-SIG-A field, an EHT-SIG-B field, an EHT-STF, an EHT-LTF, and a PE field. The EHT-SIG-B field may include resource unit allocation information and a plurality of pieces of user information, each piece of user information corresponds to one piece of service data, and each piece of user information includes a plurality of subfields. The subfields include spatial stream information, coding and modulation information, indication information, and the like of different users. A retransmission manner may include an automatic repeat request (ARQ) manner or a hybrid automatic repeat request (HARQ) manner. For example, the retransmission manner is a HARQ manner. For a specific subfield and a function corresponding to the subfield, refer to Table 3.

TABLE 3

| Subfield | Function |
| --- | --- |
| Site identifier | Used to identify a receive end |
| Number of space time streams (NSTS) | Used to indicate a number of space time streams allocated to the receive end |
| Transmit beamforming (TxBF) | Used to indicate whether beamforming is used |
| Modulation and coding scheme (MCS) | Used to indicate a modulation and coding scheme |
| Coding | Used to indicate a coding type |
| New transmission/retransmission indication | Used to indicate whether data that is of a current user and that is in a corresponding RU is newly-transmitted data or retransmitted data, or whether retransmitted service data of a hybrid automatic repeat request (HARQ) is included |
| Process identifier (HARQ Process ID) | Used to indicate a sequence number of a HARQ process |
| HARQ type | Used to indicate, for example, whether the HARQ type is a chase combining (CC) type or an incremental redundancy (IR) type, where this subfield may be reserved for newly-transmitted service data |
| Redundancy version (RV) | Used to indicate a redundancy version, where this subfield may be reserved for newly-transmitted service data |

It should be noted that the retransmitted or newly-transmitted service data may include a plurality of types of service data. For example, the retransmitted or newly-transmitted service data may be retransmitted or newly-transmitted video service data, or the service data may be retransmitted or newly-transmitted voice service data. This is not limited in this application. In addition, the data transmission method may be jointly implemented by combining a solution of retransmitted or newly-transmitted service data with a solution in another embodiment of this application. Details are not described herein again.

Figure 14:
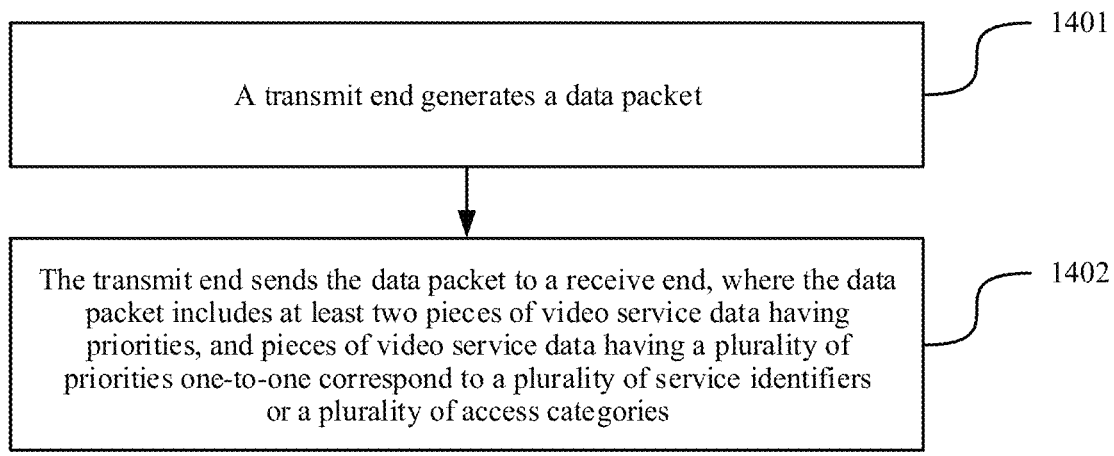
FIG. 14 is a schematic structural diagram of a data packet according to an embodiment of this application.

An embodiment of this application further provides a data transmission method. In this embodiment, video service data having different priorities one-to-one correspond to different service identifiers or access categories. The following provides a description with reference to FIG. 14.

Step 1401: A transmit end generates a data packet.

Step 1402: The transmit end sends the data packet to a receive end, where the data packet includes at least two pieces of video service data having priorities, and pieces of video service data having a plurality of priorities one-to-one correspond to a plurality of service identifiers or a plurality of access categories.

The access categories may include a video service (AC_Video, AC_VI), a voice service (AC_Voice, AC_VO), a best-effort transmission service (AC_Best Effort, AC_BE), and a background service (AC_Background, AC_BK). Contention-based transmission capabilities of the four access categories decrease in descending order.

Optionally, to ensure transmission performance of video service data having a high priority, video service data having a relatively high priority may correspond to an access category with a relatively strong contention-based transmission capability, and video service data having a relatively low priority may correspond to an access category with a relatively weak contention-based transmission capability. For example, for different pieces of video service data in a same data packet, an I-frame, a P-frame, and a B-frame correspond to different access categories, and priorities of three types of video service data such as the I-frame, the P-frame, and the B-frame decrease in descending order. For example, the I-frame corresponds to AC_VI, and the P-frame and the B-frame correspond to AC_BE.

In addition, for an I-frame, a P-frame, and a B-frame in different data packets, the I-frame, the P-frame, and the B-frame may be simultaneously transmitted in a manner of aggregation of media access control protocol data units (MAC Protocol Data Unit, Multi-TID A-MPDU) of a plurality of service identifiers.

It should be noted that processing of the pieces of video service data having different priorities and the different access categories may be combined with processing that the pieces of video service data having different priorities are carried on different communications resources for transmission, or processing of mapping the pieces of video service data to the different access categories may be independently used. This is not limited in this application.

According to this embodiment of this application, a transmit end generates a data packet, and when the data packet is sent to a receive end, pieces of video service data having different priorities are carried on different resources for transmission. In this way, a plurality of resources are allocated to each terminal, so that the terminal can perform data transmission by using the plurality of resources, thereby improving transmission flexibility. In addition, data transmission is performed by using a plurality of resources, so that a degree of data transmission obstruction can be reduced to some extent, and data transmission efficiency is improved.

Figure 15:
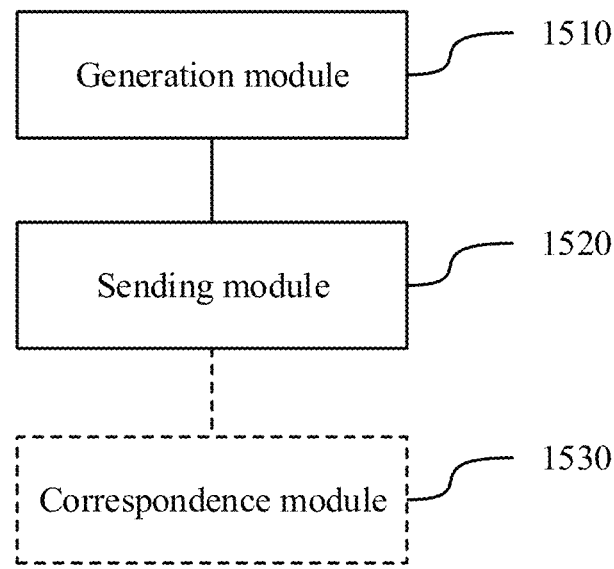
FIG. 15 is a schematic structural diagram of a data transmission apparatus according to an embodiment of this application.

Based on a same technical concept, an embodiment of this application further provides a data transmission apparatus. As shown in FIG. 15, the apparatus includes a generation module 1510 and a sending module 1520.

The generation module 1510 is configured to generate, by a transmit end, a data packet. The generation module 1510 may specifically implement a generation function in step 401 and another implicit step.

The sending module 1520 is configured to send, by the transmit end, the data packet to a receive end, where the data packet includes at least two pieces of video service data having different priorities, and the pieces of video service data having different priorities are carried on different communications resources for transmission. The sending module 1520 may specifically implement a sending function in step 402 and another implicit step.

Optionally, the communications resource includes a spatial stream, an RU, or a frequency band.

Optionally, the sending module 1520 is configured to:
based on a correspondence between a communications resource and a priority of video service data, the pieces of video service data having different priorities are carried on different communications resources for transmission, where the correspondence between a communications resource and a priority of video service data is determined based on feedback information of the receive end.

Optionally, the communications resource includes a spatial stream, the feedback information includes a sounding signal, and a correspondence between the spatial stream and a priority of video service data is determined by the transmit end based on received signal powers of the sounding signal that are detected by a plurality of transmit antennas of the transmit end.

Optionally, the communications resource includes a spatial stream; and the feedback information includes a plurality of indication bits, one of the plurality of indication bits corresponds to one of a plurality of frequency bands, and the one indication bit is used to indicate a correspondence that is between an antenna and a priority of video service data and that is on the one frequency band; or the feedback information includes one indication bit, and the indication bit is used to indicate a correspondence between an antenna and a priority of video service data.

Optionally, a preamble in the data packet includes indication information of the different communications resources, and the indication information is used to indicate video service data carried on a corresponding communications resource.

Optionally, the pieces of video service data having different priorities include at least two types of an I-frame, a P-frame, and a B-frame.

Optionally, the pieces of video service data having different priorities include retransmitted video service data and newly-transmitted video service data, and a priority of the retransmitted video service data is higher than a priority of the newly-transmitted video service data; and the data packet further includes indication information, and the indication information is used to indicate that each piece of video service data is retransmitted video service data or newly-transmitted video service data.

Optionally, the apparatus further includes:
a correspondence module 1530, configured to enable pieces of video service data having a plurality of priorities to one-to-one correspond to a plurality of service identifiers or a plurality of access categories.

It should be noted that the generation module 1510 and the sending module 1520 may be implemented by a processor, or may be implemented by a processor in cooperation with a memory and a network interface.

According to this embodiment of this application, a transmit end generates a data packet, and when the data packet is sent to a receive end, pieces of video service data having different priorities are carried on different resources for transmission. In this way, a plurality of resources are allocated to each terminal, so that the terminal can perform data transmission by using the plurality of resources, thereby improving transmission flexibility. In addition, data transmission is performed by using a plurality of resources, so that a degree of data transmission obstruction can be reduced to some extent, and data transmission efficiency is improved.

It should be noted that, when the data transmission apparatus provided in the foregoing embodiment performs data transmission, division into the foregoing functional modules is merely used as an example for description. In actual application, the functions may be allocated, as required, to different functional modules for implementation, that is, an internal structure of the apparatus is divided into different functional modules to implement all or a part of the functions described above. In addition, the data transmission apparatus provided in the foregoing embodiment and the data transmission method embodiments are based on a same concept. For a specific implementation process of the data transmission apparatus, refer to the method embodiments. Details are not described herein again.

All or a part of the foregoing embodiments may be implemented by using software, hardware, firmware, or any combination thereof. When the software is used for implementation, all or a part of the embodiments may be implemented in a form of a computer program product. The computer program product includes one or more computer instructions, and when the computer program instructions are loaded and executed on a device, all or a part of the procedures or functions described in the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, for example, a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

A person of ordinary skill in the art may understand that all or a part of the steps of the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing description is merely an embodiment of this application, but is not intended to limit this application. Any modification, equivalent replacement, or improvement made without departing from the spirit and principle of this application shall fall within the protection scope of this application.

What is claimed is:

1. A data transmission method, wherein the method comprises:
   generating, by a transmit end, a data packet;
   determining, by the transmit end and based on feedback information transmitted from a receive end, different communications resources for transmission, wherein the feedback information comprises a plurality of indicators, each indicator of the plurality of indicators corresponds to a respective frequency band of a plurality of frequency bands, and an indicator of the plurality of indicators indicates a correspondence between a transmit antenna of the transmit end and a priority of video service data on a corresponding frequency band of the plurality of frequency bands corresponding to the indicator, wherein the indicator of the plurality of indicators is generated based on a power value of the transmit antenna on the corresponding frequency band; and
   sending, by the transmit end, the data packet to the receive end, wherein the data packet comprises at least two pieces of video service data having different priorities, and the pieces of video service data having the different priorities are carried on the different communications resources for transmission.

2. The method according to claim 1, wherein the different communications resources comprise a spatial stream, a resource unit (RU), or a frequency band.

3. The method according to claim 1, wherein
   based on a correspondence between a communications resource of the different communications resources and the priority of video service data of the different priorities of the pieces of video service data, the pieces of video service data having the different priorities are carried on the different communications resources for transmission, wherein the correspondence between the communications resource and the priority of video service data is determined based on the feedback information transmitted from the receive end.

4. The method according to claim 3, wherein the different communications resources comprise a spatial stream.

5. The method according to claim 1, wherein a preamble in the data packet comprises indication information of the different communications resources, and the indication information is used to indicate video service data of the pieces of video service data carried on a corresponding communications resource of the different communications resources.

6. The method according to claim 1, wherein the pieces of video service data having the different priorities comprise at least two types of: an I-frame, a P-frame, or a B-frame.

7. The method according to claim 1, wherein the pieces of video service data having the different priorities comprise retransmitted video service data and newly-transmitted video service data, and a priority of the retransmitted video service data is higher than a priority of the newly-transmitted video service data; and
   the data packet further comprises indication information, and the indication information is used to indicate that each of the pieces of video service data is the retransmitted video service data or the newly-transmitted video service data.

8. The method according to claim 1, wherein the pieces of video service data having the different priorities one-to-one correspond to a plurality of service identifiers or a plurality of access categories.

9. A data transmission apparatus, comprising:
   at least one processor;
   one or more memories coupled to the at least one processor and storing programming instructions for execution by the at least one processor to:
   generate, by a transmit end, a data packet;
   determine, by the transmit end and based on feedback information transmitted from a receive end, different communications resources for transmission, wherein the feedback information comprises a plurality of indicators, each indicator of the plurality of indicators corresponds to a respective frequency band of a plurality of frequency bands, and an indicator of the plurality of indicators indicates a correspondence between a transmit antenna of the transmit end and a priority of video service data on a corresponding frequency band of the plurality of frequency bands corresponding to the indicator, wherein the indicator of the plurality of indicators is generated based on a power value of the transmit antenna on the corresponding frequency band; and
   send, by the transmit end, the data packet to the receive end, wherein the data packet comprises at least two pieces of video service data having different priorities, and the pieces of video service data having the different priorities are carried on the different communications resources for transmission.

10. The apparatus according to claim 9, wherein the different communications resources comprise a spatial stream, a resource unit (RU), or a frequency band.

11. The apparatus according to claim 9, wherein
    based on a correspondence between a communications resource of the different communications resources and the priority of video service data of the different priorities of the pieces of video service data, the pieces of video service data having the different priorities are carried on the different communications resources for transmission, wherein the correspondence between the communications resource and the priority of video service data is determined based on the feedback information transmitted from the receive end.

12. The apparatus according to claim 11, wherein the different communications resources comprise a spatial stream.

13. The apparatus according to claim 9, wherein a preamble in the data packet comprises indication information of the different communications resources to indicate video service data of the pieces of video service data carried on a corresponding communications resource of the different communications resources.

14. The apparatus according to claim 9, wherein the pieces of video service data having the different priorities comprise at least two types of: an I-frame, a P-frame, and a B-frame.

15. The apparatus according to claim 9, wherein the pieces of video service data having the different priorities comprise retransmitted video service data and newly-transmitted video service data, and a priority of the retransmitted video service data is higher than a priority of the newly-transmitted video service data; and
    the data packet further comprises indication information to indicate that each of the pieces of video service data is the retransmitted video service data or the newly-transmitted video service data.

16. The apparatus according to claim 9, wherein the apparatus enables the pieces of video service data having the different priorities to one-to-one correspond to a plurality of service identifiers or a plurality of access categories.

17. A non-transitory computer-readable storage medium, the non-transitory computer-readable storage medium storing one or more instructions executable by a computer system to perform operations comprising:

generating, by a transmit end, a data packet;

determining, by the transmit end and based on feedback information transmitted from a receive end, different communications resources for transmission, wherein the feedback information comprises a plurality of indicators, each indicator of the plurality of indicators corresponds to a respective frequency band of a plurality of frequency bands, and an indicator of the plurality of indicators indicates a correspondence between a transmit antenna of the transmit end and a priority of video service data on a corresponding frequency band of the plurality of frequency bands corresponding to the indicator, wherein the indicator of the plurality of indicators is generated based on a power value of the transmit antenna on the corresponding frequency band; and sending, by the transmit end, the data packet to the receive end, wherein the data packet comprises at least two pieces of video service data having different priorities, and the pieces of video service data having the different priorities are carried on the different communications resources for transmission.

18. The non-transitory computer-readable storage medium according to claim 17, wherein the different communications resources comprise a spatial stream, a resource unit (RU), or a frequency band.

* * * * *